United States Patent

[11] 3,567,890

| [72] | Inventor | Rudi Kombuchen |
| | | Adlerstrasse 70, Dusseldorf, Germany |
| [21] | Appl. No. | 810,284 |
| [22] | Filed | Mar. 25, 1969 |
| [45] | Patented | Mar. 2, 1971 |
| [32] | Priority | Apr. 10, 1968 |
| [33] | | Germany |
| [31] | | A29,625 |

[54] LIMIT SWITCH
8 Claims, 2 Drawing Figs.

[52] U.S. Cl. .................................................... 200/166, 200/172
[51] Int. Cl. ........................................................ H01h 21/28
[50] Field of Search ........................................... 200/166. (H), 47, 159, 153.19, 172 (A)

[56] References Cited
UNITED STATES PATENTS

| 2,660,904 | 12/1953 | Hilsinger, Jr. ................ | 200/172A |
| 2,740,023 | 3/1956 | Kryder ......................... | 200/159X |
| 3,244,847 | 4/1966 | Erpel............................ | 200/166H |

*Primary Examiner*—Robert K. Schaefer
*Assistant Examiner*—H. J. Hohauser
*Attorney*—Christen, Sabol and O'Brien ABSTRACT: An electric limit switch for use with a movable storage unit including a sensing member disposed through a buffer whereby the buffer acts to absorb forces to protect both the movable storage unit and the electric limit switch.

PATENTED MAR 2 1971

3,567,890

3,567,890

LIMIT SWITCH

BACKGROUND OF THE INVENTION

The present invention pertains to electric switching apparatus for use with a movable storage unit and more particularly to such electric switching apparatus including an electric limit switch combined with a buffer.

It is conventional to use movable storage units in order to obtain maximum storage space from restricted areas. These movable storage units normally move on runners adapted to engage rails under the control of electric motors supported by individual or trains of storage units. It is important in the utilization of such movable storage units that once a storage unit has reached its desired location, it is quickly and safely stopped in order to permit accurate placement of all storage units and further to prevent damage to another storage unit caused by collision with the moving storage unit.

Accordingly, electric limit switches are disposed in the storage units to stop the associated motors when the storage units reach an end position against a wall or another storage unit. Typical of such movable storage units are shelves and cupboard units. In order to reduce the collision shock and absorb the forces therefrom when a movable storage unit reaches an end position adjacent a wall or another storage unit, buffers are provided on the end walls of the storage unit to insulate the wall of the storage unit.

In the past limit switches on movable storage units have suffered great damage due to the forces experienced by the limit switch, and buffers which have been provided on the sides of the units have been insufficient to reduce the damage to the limit switches.

SUMMARY OF THE PRESENT INVENTION

Accordingly, it is an object of the present invention to combine a buffer with a sensing member for an electric limit switch for use with a movable storage unit.

Another object of the present invention is to secure a buffer for a movable storage unit on the end of a sensing member of an electric limit switch.

A further object of the present invention is to provide a sensing member for an electric limit switch that extends through a central aperture in a buffer which has a channel therein for receiving a head of the sensing member in order to protect the sensing member from damage.

Some of the advantages of the present invention are that the integral combination of a buffer and a sensing member of an electric limit switch permits protection of the sensing member as well as the movable storage unit from shock, and that the integral combination of a buffer and a sensing member reduces the number of projections on a movable storage unit to thereby reduce the possibility of accidents and damage to the movable storage unit.

The present invention is generally characterized in electric switching apparatus for use with a movable storage unit including an electric limit switch, a sensing member for controlling the operation of the electric limit switch and a buffer housing a portion of the sensing member whereby the buffer protects the movable storage unit and the electric limit switch by absorbing contact forces.

Further objects and advantages of the present invention will become apparent from the description of the preferred embodiments as shown in the accompanying drawings.

DESCRIPTION OF THE PREFERRED EMBODIMENTS

In as much as the electric switching apparatus of the present invention may be utilized with any conventional movable storage unit, the embodiments of FIGS. 1 and 2 will be described without the illustration of a movable storage unit.

Figure 1:
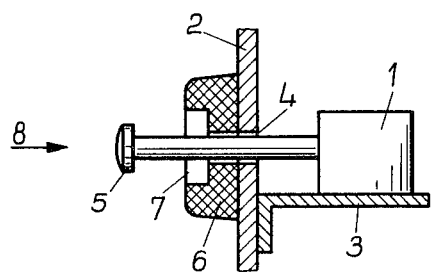
FIG. 1 is a side elevation in partial section of a first embodiment of the present invention.

With reference to the first embodiment of the present invention, as illustrated in FIG. 1, the movable storage unit includes a wall 2 which faces in the direction of travel of the movable storage unit on a plurality of rails. A conventional electric switch 1 is mounted on an angle iron 3 which is secured to wall 2. Switch 1 may be secured directly to wall 2 of the movable storage unit or to a wall in the storage area or to one of the rails on which the storage units ride.

An aperture 4 is provided in wall 2, and an elongated sensing pin 5 extends therethrough. Sensing pin 5 has a flattened head at one end for engaging an object or surface to be sensed and its other end is connected with electric switch 1 in a conventional manner such that the electric switch is operated when sensing pin 5 is moved longitudinally into and out of the switch. A buffer 6, made from any suitable resilient material such as plastic or rubber, has a central aperture therethrough and is secured to wall 2 in any conventional manner, such as by adhesives or screws or bolts, in order to house a portion of sensing pin 5. A recess 7 is provided in buffer 6 and is concentric with the center aperture of buffer 6 in order to receive the head of sensing pin 5 when it is moved longitudinally into electric switch 1. The dimensions of recess 7 are such that the head of sensing pin 5 is not subject to outside forces once sensing means 5 has been longitudinally moved to operate the electric switch 1.

In operation, relative movement of either the movable storage unit supporting the electric switch apparatus or another movable storage unit is indicated by arrow 8; and, upon contact, sensing pin 5 is moved longitudinally into electric switch 1 to operate the switch. Switch 1 may, of course, be either closed or open in response to the longitudinal movement of sensing pin 5. It can be seen that buffer 6 not only acts as a buffer to absorb contact forces that would ordinarily be applied to the walls of the movable storage unit but also acts as a buffer to absorb contact forces from sensing pin 5 which otherwise would be directly transmitted to electric switch 1 with adverse effects.

Figure 2:
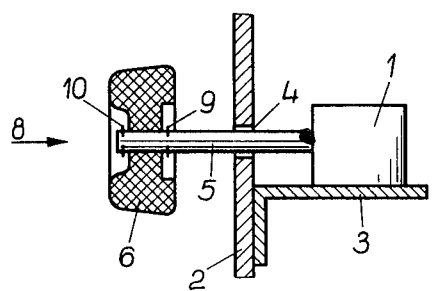
FIG. 2 is a side elevation in partial section of the second embodiment of the present invention.

A second embodiment of the present invention is illustrated in FIG. 2 and parts of the second embodiment that are identical to parts of the first embodiment are given identical reference numerals and are not described again.

The primary difference of the embodiment of FIG. 2 from the embodiment of FIG. 1 is that a buffer 6 houses and is secured to a portion of elongated sensing pin 5 rather than to a wall 2 of the movable storage unit. Buffer 6 has a pair of recesses in either surface and is connected with sensing pin 5 by means of discs 9 and 10 which engage grooves in sensing pin 5 and are disposed in the recesses on either side of buffer 6, respectively. No head is required for sensing pin 5 since buffer 6 is shaped so as to extend beyond sensing pin 5 in a longitudinal direction in order to directly receive contact from a surface or object.

In the same manner as discussed with respect to FIG. 1, buffer 6 acts as a buffer for both the movable storage unit and the electric switch and further acts to protect the extended sensing pin 5 from damage in its extended and retracted positions. This is quite important in that normally electric limit switches of the type used with movable storage units utilize a relatively thin sensing pin.

In as much as the present invention is subject to many variations, modification and changes in detail, it is intended that all matter described in the foregoing specification or shown in the accompanying drawings shall be interpreted as illustrative and not in a limiting sense.

I claim:

1. In electric switching apparatus for use with movable storage units having electric motor drive means and a supporting surface for a switch actuator to control the motor drive means, the combination including protective actuating means for the switch means including a pair of coacting elements, at least one of said pair of elements comprising a sensing member having an end portion movable between a first position spaced away from said supporting surface and a second position closer to said supporting surface to stop a motor drive means for the unit, the other of said pair of elements comprising a resilient buffer, at least one portion of said buffer having a thickness greater than the distance between said end portion and the supporting surface when the end portion is in said second position, whereby when said protective actuating means engages an object when in said first position further movement the unit will move the sensing member to the second position and said buffer will limit further movement thereof by abutting engagement between said object and said supporting surface.

2. The switching apparatus defined in claim 1, wherein said sensing member is an elongated arm disposed a right angles to said supporting surface, and said resilient buffer surrounds said arm.

3. The switching apparatus defined in claim 2, wherein said buffer is provided with a generally flat surface for contact with an object, said surface having an inwardly directed recess in the area surrounding said arm.

4. The switching apparatus defined in claim 3, wherein said buffer is fixed on said supporting surface of a unit.

5. The switching apparatus defined in claim 3, wherein said buffer is secured to said elongated arm.

6. The switching apparatus defined in claim 5, wherein said buffer is also provided with a second generally parallel surface for contact with said supporting surface, said second surface also having an inwardly directed recess in the area surrounding said elongated arm.

7. The switching apparatus defined in claim 3, wherein said buffer comprises a generally disc-shaped element of resilient material having a central aperture through which said elongated element projects.

8. The switching apparatus defined in claim 7, wherein said disc-shaped buffer is secured to said elongated arm by a pair of spaced discs engaged in grooves provided in the elongated arm.